United States Patent
Eng et al.

(10) Patent No.: US 9,025,740 B2
(45) Date of Patent: *May 5, 2015

(54) METHOD AND SYSTEM FOR IMPROVED COMMUNICATION SECURITY

(75) Inventors: Kai Y. Eng, Atlantic Highlands, NJ (US); Pramod Pancha, Belle Mead, NJ (US)

(73) Assignee: Bellmar Communications LLC, Navesink, NJ (US)

( * ) Notice: Subject to any disclaimer, the term of this patent is extended or adjusted under 35 U.S.C. 154(b) by 833 days.

This patent is subject to a terminal disclaimer.

(21) Appl. No.: 12/775,117

(22) Filed: May 6, 2010

(65) Prior Publication Data
US 2011/0274259 A1 Nov. 10, 2011

(51) Int. Cl.
  *H04M 1/64* (2006.01)
  *H04M 1/725* (2006.01)
  *H04M 1/673* (2006.01)
  (Continued)

(52) U.S. Cl.
  CPC .......... *H04M 1/7258* (2013.01); *H04M 1/2535* (2013.01); *H04M 1/673* (2013.01); *H04M 1/72525* (2013.01); *H04M 7/003* (2013.01)

(58) Field of Classification Search
  CPC ....... H04M 1/66; H04M 1/663; H04M 1/665; H04M 1/667; H04M 3/205; H04M 7/0078; H04M 2203/60
  USPC ........ 379/93.03, 88.13, 88.19, 88.2; 455/418, 455/426.1, 416, 466; 709/206, 224, 227; 370/494; 705/34, 80
  See application file for complete search history.

(56) References Cited

U.S. PATENT DOCUMENTS

2001/0038624 A1   11/2001   Greenberg et al.
2002/0188684 A1*  12/2002   Liang ............................ 709/206
(Continued)

FOREIGN PATENT DOCUMENTS

| CN | 1846429 A   | 10/2006 |
|----|-------------|---------|
| CN | 101207482 A | 6/2008  |
| CN | 101277191 A | 10/2008 |

OTHER PUBLICATIONS

Examiner: Jiang Xiaying, "Related CN Patent Application No.: 201110162959.1 Office Action", May 2, 2013, Publisher: SIPO, Published in: CN.
(Continued)

*Primary Examiner* — Md S Elahee
(74) *Attorney, Agent, or Firm* — Kaplan Breyer Schwarz & Ottesen, LLP

(57) ABSTRACT

Security is improved in a communication system in which a communication connection is established when a user who has received a software button on his computing device (a Recipient) clicks on the button. When a Recipient first actuates a software button, a basic type of communication connection is established, during which the Recipient's identity can be verified. The Recipient then establishes a personal identification code, which he will have to provide upon future actuations of the software button. The system then enables other types of communication connections to be established by the Recipient. After the Recipient actuates the software button and verifies his identity, the system remembers the identity and location of the computing device he is using. When the Recipient subsequently actuates the software button, the identity and location of his computing device are checked, and verification of his identity is suppressed if they have not changed.

11 Claims, 3 Drawing Sheets

(51) Int. Cl.
*H04M 7/00* (2006.01)
*H04M 1/253* (2006.01)

(56) References Cited

U.S. PATENT DOCUMENTS

| | | | |
|---|---|---|---|
| 2005/0131765 A1* | 6/2005 | Rivera et al. | 705/26 |
| 2005/0180464 A1* | 8/2005 | McConnell et al. | 370/494 |
| 2007/0118656 A1* | 5/2007 | Anderson et al. | 709/227 |
| 2007/0167157 A1* | 7/2007 | Hundal | 455/426.1 |
| 2010/0070623 A1* | 3/2010 | Sawada | 709/224 |
| 2011/0035302 A1* | 2/2011 | Martell et al. | 705/34 |

OTHER PUBLICATIONS

Examiner: Jiang Xiaying, "Related Chinese Patent Application No.: 2011-10162959.1", "Office Action", Jul. 28, 2014, Publisher: SIPO, Published in: CN.

* cited by examiner

METHOD AND SYSTEM FOR IMPROVED COMMUNICATION SECURITY

BACKGROUND OF THE INVENTION

The present invention relates generally to electronic communication and, more particularly, concerns maintenance of security in communications which can be initiated through an externally provided, actuable executable, such as a software button.

Communications associated with the present invention are provided through the use of a "computing device", which will be understood to include not only an actual computer, such as a personal computer, but also any kind of intelligent device, such as a personal digital assistant (PDA) or a smart telephone, capable of Internet browsing. For voice communications, the device will need to be capable of sensing sound, as through a microphone, and producing sound, as through a speaker or earphone. Communication takes place through a network, such as the Internet and, possibly, through the public service telephone network (PSTN).

In our co-pending U.S. patent application Ser. No. 12/603,683, filed Oct. 22, 2009, we disclose a method and system for facilitating telephone calls that convey the context of the call to the called party. The disclosure of that patent application is incorporated herein by reference in its entirety. In accordance with one embodiment of the invention disclosed in that patent application, a software button is utilized on a computing device to initiate a call. Activation of the button causes a "soft phone" to be downloaded from a server. The soft phone is essentially an executable software agent that operates on the computing device to set up a call to only a specified telephone number. The software agent causes certain call context information to be embedded which is unique to the actuated software button.

In our co-pending U.S. patent application Ser. No. 12/691,978, filed Jan. 22, 2010, we disclose that the use of a software button and downloaded software agent can offer additional benefits in providing privacy, security and dynamic control of service. As an example, we disclose an online directory, similar to a telephone directory but comprised of software buttons, in which a calling party could select a called party by clicking a software button dedicated to the called party. The button provides an identification of the called party, but some or all contact information could be hidden and inaccessible to the calling party. A server containing the directory causes download of a software agent to the calling party's computing device, which causes the calling party's computing device to establish communication with the called party. However, the called party is able to maintain privacy, or even complete anonymity.

In the same application, we also disclose software buttons utilized to provide a communication service which is dynamic. That is, the nature or type of service changes based upon conditions predefined by the called party and information provided by the calling party. For example, a called party might specify that, during business hours, communication be by telephone to a specific telephone number and outside of business hours, communication be by text message if urgent and e-mail if not urgent. When the calling party clicks a software button, the software agent downloaded to his computing device would then be a soft phone during business hours. Outside of business hours, a software agent would be downloaded to the calling party which would inquire whether the call is urgent and, depending upon the response, would provide a text message agent or an e-mail agent, respectively.

The disclosure of co-pending U.S. patent application Ser. No. 12/691,978 is hereby incorporated herein by reference in its entirety.

One of the outstanding advantages of communication based upon software buttons is its spontaneity and simplicity. However, a number of security issues impact upon its utility. For example, the Sender of a software button should be protected against receiving spam and must be assured of the authenticity of the caller before picking up a call. Moreover, any security mechanism imposed must not interfere with the basic spontaneity and simplicity of this type of communication.

In accordance with one aspect of embodiments of the present invention, when a Recipient first actuates a software button, a basic type of communication connection is established, during which the Recipient's identity can be verified. The Recipient then establishes a personal identification code, which he will have to provide upon future actuations of the software button. The system then enables other types of communication connections that can be established by the Recipient.

In accordance with another aspect of embodiments of the present invention, when the Recipient actuates the software button and verifies his identity, the system remembers the identity and location of the computing device he is using. When the Recipient subsequently actuates the software button, the identity and location of his computing device are checked, and verification of his identity is suppressed if they have not changed.

BRIEF DESCRIPTION OF THE DRAWINGS

The foregoing description and other objects, features, and advantages of the present invention will be understood more completely from the following detailed description of presciently preferred, but nonetheless illustrative, embodiments in accordance with the present invention, with reference being had to the accompanying drawings, in which.

DETAILED DESCRIPTION OF THE PREFERRED EMBODIMENTS

Figure 1:
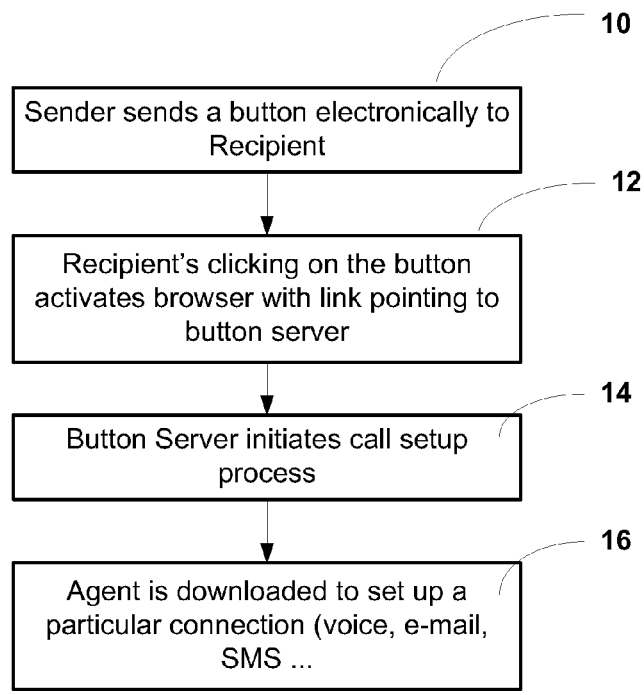
FIG. 1, is a functional block diagram illustrating the overall service operations for users and subscribers of a button service system of the type utilizing the present invention.

The terminology defined in this paragraph will be used consistently herein. A button is sent from a "Sender" to a "Recipient." When clicking on a button, the Recipient is attempting to initiate a call to the Sender. Thus, when the call is established, the (button) Recipient is the "Caller" (making the call), and the (button) Sender is the "Receiver" (of the call). Recipient and Sender are associated with the button operation, and Caller and Receiver are associated with the call session.

Making a communication connection with another party typically means making a telephone call (PSTN, cell or VoIP), sending an SMS (Short Message Service) message on a cell phone, sending an Instant Message (IM) on a computer or sending an email. In each of these examples, a Caller, who initiates the call or the connection (real-time or messaging) with his telephone or computing device, makes a clear choice of the connection or service type to be used (i.e., phone, email, IM or SMS). Depending on the service type selected, the resulting connection is made to the appropriate receiving device (phone, computer, email box, etc.) used by the Receiver, who is the intended recipient of the call.

These types of connections are referred to herein as "static", because the underlying Caller or Receiver behavior and the underlying technical operations involving transmission, routing and reception of data are essentially predetermined when the Caller makes the call. For example, a Caller's initiation of a phone call results in a phone call connection, which does not unexpectedly change to an email session. Here we are referring to the call itself and not the known technique of changing the service delivery of data to the Receiver after the call or connection is completed, such as by using an answering machine, turning a recorded message into an email, or forwarding a message to SMS. These post-connection delivery actions do not change the static nature of the call itself. Similarly, dynamic routing of data to different physical destinations, such as call forwarding or call transfer does not alter the static nature of the call or connection.

A call or connection will be deemed "dynamic" or "intelligent" if the connection resulting from a call initiation can vary in dependence upon instantaneous states derived from inputs and/or parameters related to the Caller and/or Receiver. For example, a software button labeled "Connect to Joe Doe" is sent to a Recipient allowing the Recipient to make a call to Joe Doe, the "Sender" (of the button). When this Button is actuated (e.g. clicked) at different times, the resulting connection may be completely different. For example, the connection may be a phone call at one time and an SMS session at another time, generally not determined by the Caller's (the button "Recipient's") action alone.

Those skilled in the art will appreciate that the present invention is applicable to software button communication systems in which the buttons create static or intelligent connections.

FIG. 1 is a flowchart illustrating the service usage steps between a Sender and a Recipient in a software button communication system making use of the present invention. The process begins at block 10 when the Sender sends a software button to a Recipient's computing device (for example, by email). When the Recipient actuates the received button by clicking on it (block 12), he can initiate a call or connection to the Sender. No preinstalled software is required on the Recipient's computing device other than a standard Internet browser.

After the Recipient initially clicks the button, a particular service connection is initiated to reach the Sender at block 14. In a system using intelligent buttons, this may involve communication with the Recipient to obtain information (e.g. urgency of communication) necessary to determine the type of connection. The logic for call handling based on received information is determined by the conditions preset by the Sender. Thereafter, control is transferred to block 16, where an appropriate executable agent is downloaded to the Recipient's browser to support the particular service being initiated. The process ends at block 16.

Figure 2:
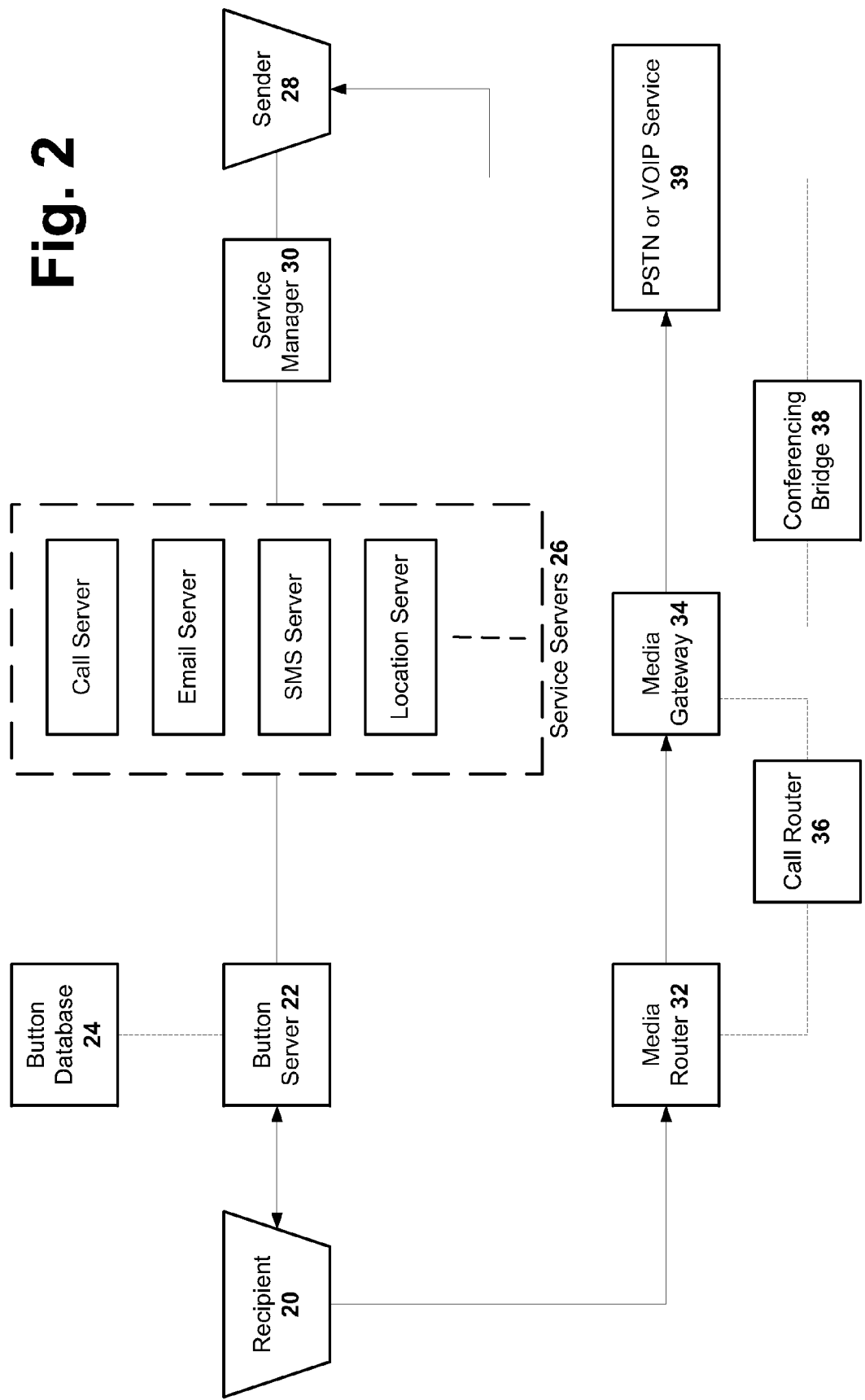
FIG. 2 is a functional block diagram of an button service system of the type utilizing the present invention.

FIG. 2 is a functional block diagram of an intelligent button service system of the type making use of the present invention. A button received by a Recipient's computing device 20 is essentially a website link to a Button Server 22. In addition to the Button Server address, the button is also encoded with unique button identification (BID). When the button is clicked, the Recipient's web browser opens a link directed to the Button Server as equivalent to a call request. When the BID is received by Button Server 22, a lookup is done immediately in a button database 24 accessible to Button Server 22, using the BID, to retrieve the state of the Button.

The state of the Button here refers to parameters preset by the Sender for various options for responding to a call request. These parameters may be changed by the Sender at will by accessing Database 24. For instance, a Sender may set an option to post a particular message and to respond with an SMS connection. In that case, an agent will be downloaded from the Button Server to the Recipient's computing device to display the Sender's message and also a user interface for the Recipient to input a message to be sent as SMS to the Sender. At another time, a click on the same Button may result in a direct phone call to the Sender, assuming the Sender has chosen to set the Button state to respond with a voice connection. Some options may also request additional inputs from the Recipient before a particular connection is chosen, such as to whether the call is urgent or not.

The service servers 26 shown in FIG. 2 are used to provide various services or connections. The Sender's computing device 28 has access to servers 26 through a Service Manager 30, in order to set up various services. For example, the Sender needs to provide telephone numbers and e-mail addresses to service servers 26. For real time services, e.g., voice or video, media packets are transmitted from the Recipient's computing device 20 to a Media Router 32 and media gateway 34 for handling instead of going through the Button Server. Also included are a Call Router 36 and a Conference Bridge 38 for handling these routine communication functions. It should be noted that there are also non-connection oriented services possible in this system, e.g. Sender Location or Presence. The Service Servers 26 may also include a Conferencing Server.

In configuring a particular communication option, a Sender obviously has to provide appropriate parameters to use. For example, the Sender has to specify a phone number for calling, an email address for email, and so on. These parameters are written into button database 24, available to server 22, and they are hidden from the users. The parameters provided by a subscriber can be changed anytime.

Security concerns center around assurance of Caller authenticity and Called Party authenticity. As far as Caller authenticity is concerned, there are two specific issues: (i) whether the Caller is human; and (ii) whether the Caller is the real button recipient. The first issue is an anti-spam consideration essential to avoid having a system attacked by a machine.

To ensure that the software button has been clicked by a human, use could be made of a Captcha mechanism, which presents the user with alphanumeric symbols in a distorted image and requires him to enter the symbols. However, it is preferred that the caller be presented with Captcha words which he must speak, and that the words be authenticated through voice recognition.

As far as authenticating the Recipient identity is concerned, it is preferred that this be done by providing him a personal identification number (PIN) for him to enter when the connection is first made. Security considerations dictate that the PIN be provided to the recipient apart from the software button. Typically, a Recipient is provided with a personal software button via e-mail. Although the PIN may then, for example, be provided via an SMS text message, this might be inconvenient in a streamlined system.

Preferably, a software button communication system in accordance with the present invention will only authorize a simple type of communication, for example voice communication, when the button is first operated. When the Recipient makes his first communication, he is authenticated by the Sender during this communication. This authentication may be done in several ways: through recognition of the Recipient's voice; through known information about the Recipient; or through a password, or the like.

Once the Recipient is authenticated, the Sender initiates the PIN setup process. Alternatively, the Sender could provide a PIN to the system upon which he and the recipient agreed in the initial communication. In a system in which the Sender only initiates PIN setup, the system will then post a PIN selection request to the Recipient. Once the Recipient has selected a PIN, additional services will be turned on for the Recipient, as authorized by the Sender. Whenever the Recipient connects to the system thereafter, he will be subjected to PIN verification.

Figure 3:
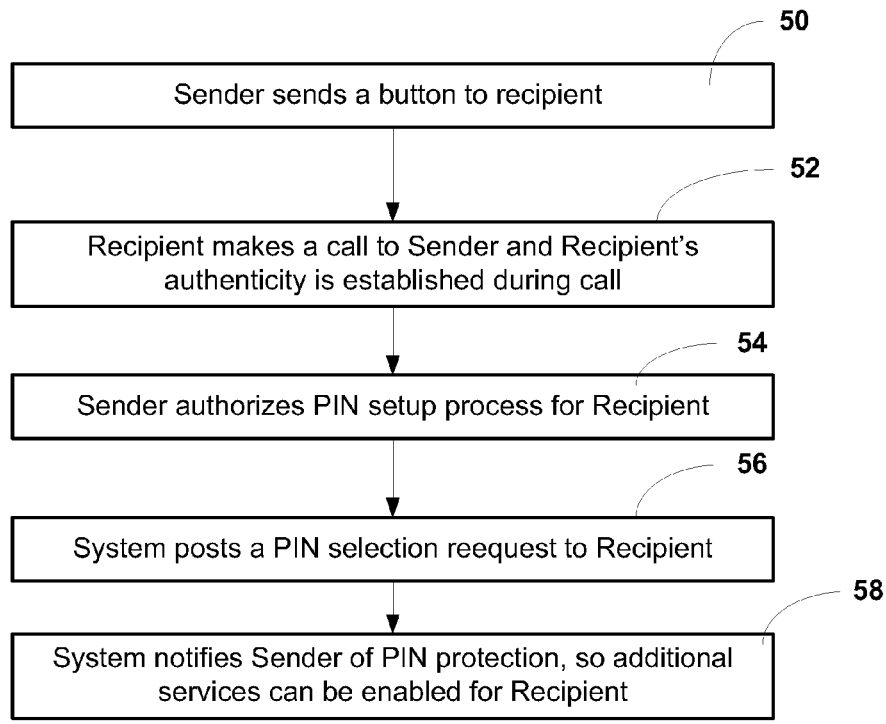
FIG. 3 is a flow chart illustrating a PIN setup process in accordance with an embodiment of the present invention, the process being designed to improve security of a button service system.

FIG. 3 is a flow chart illustrating the PIN setup process as just described. The process begins at block 50, when the Sender sends a software button to the Recipient. At block 52, the Recipient makes a call to the Sender, and the recipient's authenticity is established during the call. At block 54, the Sender authorizes a PIN setup process for the recipient, causing the system to post a pin selection request to this Recipient (block 56). At block 58, the system notifies the Sender that PIN protection for the Recipient has been completed, and additional services are enabled for the Recipient.

As much as PIN verification is desirable, it does become cumbersome if the Recipient must undertake PIN verification on every actuation of a software button. This is a particular disadvantage this type of a system in which streamlined and convenient access are primary features. We have therefore defined the concepts of a software button "session", and automatic session management. Basically, the idea is to require PIN verification only once during a session.

As a starting point, we define that a session will continue as long as the physical device being used by the recipient and its location have not changed since the last completion of PIN verification. After completion of PIN verification, button server 22 can record the physical identity and location of the device, and no PIN verification will be required as long as these do not change.

It is assumed that the Recipient is using either a smart cellular phone (smartphone) or an actual computer or computing device (also referred to generically as PC). When the Recipient activates the software button, the button server 22 will monitor certain parameters to determine the physical device being used and its location. As far as identification of the device is concerned, if it is a smart phone, server 20 need merely monitor the PSTN number associated with the telephone. In the case of a PC, a smart cookie is stored in the Recipient's browser by the server upon PIN verification. If the smart cookie, a PC identifier, is present when the Recipient activates the button, it confirms the identity of the device. As an enhancement, the server could maintain a record of the identity of all PCs recently used by the Recipient and a session could be deemed to continue even if the device has changed, provided the Recipient is on a recently used device.

As for location determination, button server 22 could readily track and record the IP address of the recipient's device, and the location would be deemed unchanged if the IP address remains the same. As an enhancement, the server could maintain a record of the IP addresses recently used by the Recipient and a session could be deemed to continue even if the IP address has changed, provided the Recipient is at a recently used IP address.

Thus, three parameters may be tracked to ensure continuity of the session in accordance with the present embodiment: PSTN number, PC identifier and IP address. If there is no change in any of these parameters, it is assumed that the session continues. If a change does occur to any of the parameters, it must be determined whether the same session is in effect or a new session has been started. The following truth table, Table 1, summarizes the decision process

TABLE 1

|  |  |  | IP Address Unchanged | IP Address Changed |
|---|---|---|---|---|
| PSTN Number Available | PSTN Number Unchanged | PC ID Unchanged | same | same |
|  |  | PC ID Changed | same | same |
|  | PSTN Number Changed | PC ID Unchanged | new | new |
|  |  | PC ID Changed | new | new |
| PSTN Number Unavailable |  | PC ID Unchanged | same | new |
|  |  | PC ID Changed | new | new |

In Table 1, the three left-hand columns and the top row represent conditions that may exist in the system, and the two right-hand columns indicate the decision that is made as to whether the session persists (same) or is a new session (new). For example, if the Recipient is using a smartphone, a PSTN number will be available. If the PSTN number has changed, the PC ID has not changed and the IP address is unchanged, the third cell in the third column of the table applies, and the decision is made that this is a new session (the third cell of the fourth column). On the other hand, if the recipient is using a PC, a PSTN number will not be available, the fifth cell of the third column and the left-hand cell of the top row of the table apply, and the decision is made that this is the same session (the fifth cell of the fourth column).

Figure 4:
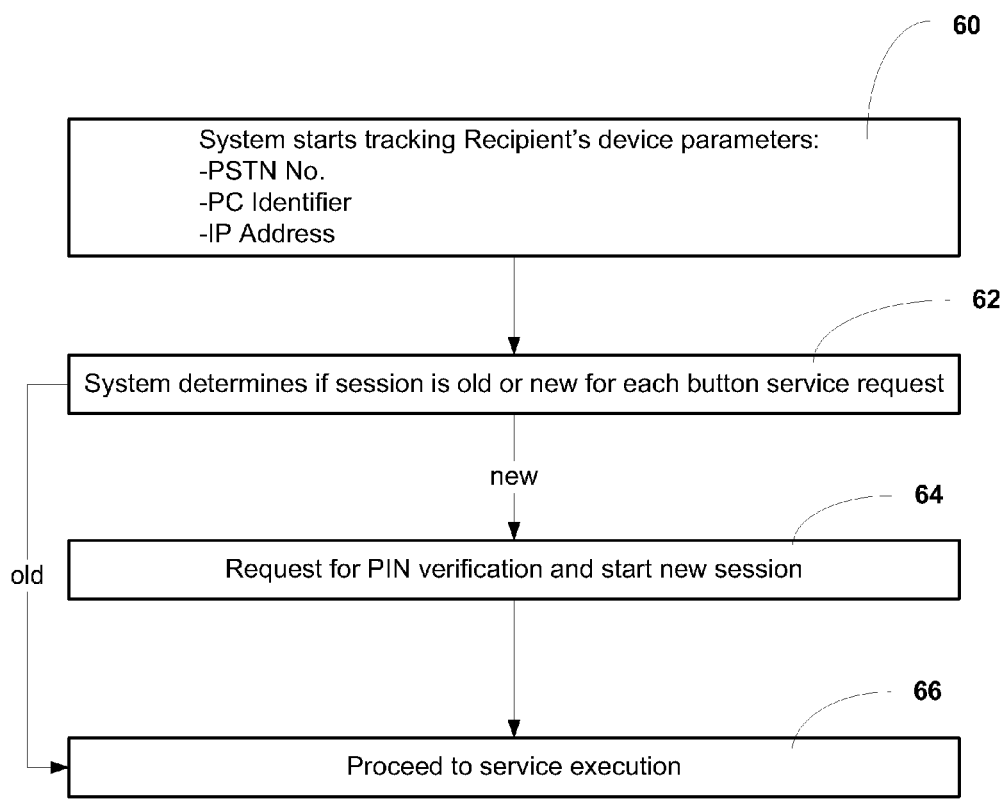
FIG. 4 is a flowchart illustrating an automatic session management process designed to reduce the frequency of security verifications in a button service system embodying the present invention.

FIG. 4 is a flowchart illustrating the automatic session management process discussed above. The process starts at block 60, where the system starts tracking the Recipient's device parameters, following PIN verification. In this embodiment, three parameters are tracked: the PSTN number of the recipient's device; its PC identifier; and its IP address. Each time the Recipient activates the software button, the system determines if the session is new or old, using the criteria set forth in Table 1 (block 62). If it is determined at block 62 that the session is new, processing continues at block 64, where a request for PIN verification is made to the Recipient, and a new session is started, assuming PIN verification is satisfied. Processing then continues at block 66, where execution of the requested service begins. On the other hand, should it be determined at block 62 that the session is old, control transfers immediately to block 66 (skipping block 64), where execution of the requested service begins. The process ends at block 66.

This brings us to the issue of assurance of called party (Receiver) authenticity. That is, before the Recipient of a software button activates it to become a Caller, he needs to be assured that the button actually originates with the Sender and will set up communication with him. For this purpose, media verifying the identity of the Sender is stored on a server and is uploaded and presented to the Recipient when he clicks on the software button. The Recipient is then given the opportunity to continue with the completion of the connection or abort it. The verifying media may be a secret image, a voice recording or any other information that would identify the Sender as the source of the software button.

Although preferred embodiments of the invention have been disclosed for illustrative purposes, those skilled in the art will appreciate that many additions, modifications, and substitutions are possible without departing from the scope and spirit of the invention as defined by the accompanying claims.

What is claimed:

1. A method for establishing a secure communication connection between a calling computing device connected to a network and a second device, comprising the steps of:
   providing for the calling computing device a software button originating outside the calling computing device which is associated with the second device and is actuable by a first user of the calling computing device;
   upon actuation of the software button by the first user, downloading an executable agent to the calling computing device, effective to establish a communication connection between the calling computing device and said second device, which communication connection has been requested by the calling computing device;
   determining a type of the communication connection to be established based on parameters preset by a second user of the second device and specified in the software button;
   during the communication connection, verifying the identity of the first user of the calling computing device; and
   after verifying the identity of the first user of the calling computing device, requiring the first user to select a personal identification code for use to enable a more secure connection for future actuations of the software button.

2. The method of claim 1 wherein the type of connection is one of the group consisting of: a telephone call; an Short Message Service (SMS) message; an instant message (IM); and a voice over internet protocol (VoIP) call.

3. The method of claim 1 further comprising enabling additional types of communication connections for the calling computing device after the personal identification code has been selected.

4. The method of claim 3 wherein the first type of connection is of a more limited type than at least one of the additional types of connections.

5. The method of claim 1 wherein verifying the identity of the first user of the calling computing device comprises one of (i) recognizing the voice of the first user during a voice call, (ii) receiving a predetermined alphanumeric password from the first user, and (iii) receiving a response from the first user to a question which is readily answered by him but not by others.

6. The method of claim 1 utilized in a system in which access by the first user thereto via a computing device is controlled by verifying the identity of the first user, the first user being able to access the system via different, identifiable computing devices, at least one of which is relocatable, the calling computing device being one of said identifiable computing devices, said method further comprising the steps of:
   after the first user has selected his personal identification code, when the system is next accessed by the first user verifying his identity by requiring entry of his personal identification code, sensing and storing the identity and location of the calling computing device; and
   on subsequent access to the system by the first user, suppressing user identity verification if the identity of the calling computing device he is using and its location have not changed.

7. A system for establishing a secure communication connection between a calling computing device connected to a network and a second device, comprising:
   a generator of a first executable agent constituted to establish a communication connection between the calling computing device and the second device and
   a software button which is associated with the second device, is available to the calling computing device, is actuable by a first user of the calling computing device, and is constructed so as to cause the first executable agent to be downloaded from the generator to the calling computing device, wherein the communication connection is of a type preset by a second user of the second device and specified in the software button;
   means accessible to the second device for verifying the identity of the first user of the calling computing device through the communication connection after it is established; and
   means interacting with the first user of the calling computing device after his identity has been verified for establishing a personal identification code for his use to enable a more secure connection setup for future actuations of the software button.

8. The system of claim 7 wherein the type of connection is of a type selected from the group consisting of: a telephone call; an Short Message Service (SMS) message; an instant message (IM); and a voice over internet protocol (VoIP) call.

9. The system of claim 8 further comprising a generator of additional executable agents constituted to establish additional types of communication connections for the calling computing device after the personal identification code has been established.

10. The system of claim 9 wherein the additional types of connections connection type is an SMS message.

11. The system of claim 7 wherein the means for verifying the identity of a first user of the calling computing device performs one of (i) recognizing the voice of the first user during a voice call, (ii) receiving a predetermined alphanumeric password from the first user, and (iii) receiving a response from the first user to a question which is readily answered by him but not by others.

* * * * *